United States Patent [19]

Okazaki et al.

[11] Patent Number: 4,630,353

[45] Date of Patent: Dec. 23, 1986

[54] INSULATION COVERING STRIPPING DEVICE

[75] Inventors: Takashi Okazaki, Toyonakashi; Yukio Matsu'ura, Takatsukishi; Yoshihiko Saijo, Ibaragishi, all of Japan

[73] Assignee: Nippon Acchakutanshi Seizo Kabushiki Kaisha, Osakashi, Japan

[21] Appl. No.: 775,773

[22] Filed: Sep. 13, 1985

[30] Foreign Application Priority Data

Sep. 13, 1984 [JP] Japan ................................ 59-192268

[51] Int. Cl.[4] ....................... B23P 23/00; H01R 43/05; H01R 43/01

[52] U.S. Cl. ..................................... 29/564.4; 29/749; 29/753; 29/867

[58] Field of Search ................ 29/33 M, 564.4, 566.3, 29/747, 749, 753, 865–867

[56] References Cited

U.S. PATENT DOCUMENTS

| | | | |
|---|---|---|---|
| 3,939,552 | 2/1976 | Hart et al. | 29/867 |
| 4,136,440 | 1/1979 | Brandewie et al. | 29/564.4 X |
| 4,194,281 | 3/1980 | Gudmestad | 29/867 |
| 4,235,015 | 11/1980 | Funcik et al. | 29/749 X |
| 4,495,682 | 1/1985 | Matsui et al. | 29/566.3 X |

FOREIGN PATENT DOCUMENTS

| | | | |
|---|---|---|---|
| 37202 | 10/1981 | European Pat. Off. | 29/564.4 |

*Primary Examiner*—Gil Weidenfeld
*Assistant Examiner*—Steven C. Bishop
*Attorney, Agent, or Firm*—Antonelli, Terry & Wands

[57] ABSTRACT

An insulation covering stripping device for use in combination with automatic apparatus for manufacturing electrical harnesses, the device being included in a moving chuck for pulling out the insulation clad wires to a desired length so that the insulation covering stripping is carried out as the same time as when the lengths of the wires are measured, thereby shortening the operation time of manufacturing electrical harnesses.

3 Claims, 20 Drawing Figures

INSULATION COVERING STRIPPING DEVICE

BACKGROUND OF THE INVENTION

1. Field of the Invention

The present invention relates to an insulation covering stripping device for removing the insulation covering of wires, wherein the wires are assembled as an electrical harness with a contact-type connector at their one end, and with their other ends being free from the connector. The insulation covering stripping device, hereinafter referred to as merely as the stripping device, is adapted for use in association with an automatic apparatus for manufacturing electrical harnesses.

2. Description of the Prior Art

Recently semi-automatic or fully automatic apparatus for producing such harnesses have been developed, typical examples of which are disclosed in Japanese Patent Kokai (unexamined Publication) No. 58(1983)-145080, U.S. Pat. Nos. 4,136,440 and 4,310,967.

The finished electrical harness has electrical conductors covering with an insulation covering at its connector-free end, and when the harness is used, it is necessary to remove the insulation covering so that the electrical conductors are connected to circuits and instruments. To remove the insulation covering automatically, a stripping device is provided in the system for manufacturing electrical harnesses. Under the conventional system, however, the stripping process is carried out independently of the other processes, such as the wire length measuring process and the connector attaching process. In order to shorten the operation time, it is required for the stripping process to be carried out at the same time as when other processes are performed.

Furthermore, it is required that the uncovered electrical conductors have varying lengths. However, the conventional stripping device is constructed so as to remove the insulation covering to one predetermined length. This is sometimes inconvenient; for example, when the conductors are soldered they can be 5 mm or so in length, whereas, when they are wrapped, they must be as long as 20 to 30 mm; otherwise, the wrapping would be impossible.

OBJECTS AND SUMMARY OF THE INVENTION

The present invention aims at solving the problem pointed out with respect to the conventional stripping device, and has for its object to provide an improved stripping device which can vary the lengths of the insulation covering to be stripped from wire to wire in accordance with the purposes to which the electrical harness is applied.

Other objects and advantages of the present invention will become more apparent from the following description when taken in conjunction with the accompanying drawings which show, for the purpose of illustration only, one embodiment in accordance with the present invention.

According to the present invention, there is provided an insulating covering stripping device for use in combination with automatic apparatus for manufacturing electrical harnesses, wherein the apparatus includes a wire feed path extending and substantially horizontally and axially of the apparatus; a connector attaching device comprising a cooperating assembling punch and die pair disposed on respective sides of the wire feed path, and a wire cutting blade located adjacent to the punch and die pair; a connector supplying device for supplying the connectors to the assembling die; a first chuck reciprocally movable along the wire feed path for pulling out the wires in its advancing movement for a distance corresponding to a desired length of the electrical harness; a second chuck for holding the supplied wires laterally at equal intervals, and guiding the same to the connector attaching device along the wire feed path, the second chuck reciprocally movable in a small range during which movement to align the top ends of the wires, characterized in that the insulation covering stripping device comprises:

a third moving chuck for adjusting the lengths of the insulation covering to be stripped, the third moving chuck being located between the connector attaching device and the second moving chuck;

a stripping length varying device for varying the lengths of insulation covering to be stripped, the device being located between the second and third moving chucks, and including a plurality of varying plates which correspond to the individual wires so that when the varying plates are moved down to push the wires individually, the wires are slackened downward, thereby causing the top ends of the wires to withdraw in accordance with the slackened portion; and a stripping blade for slitting the insulation covering so that the insulation covering is removed from the slit when the wires are pulled backward, wherein the end portions of the wires are differentiated in length by the stripping length varying device.

DETAILED DESCRIPTION OF THE PREFERRED EMBODIMENT

Figure 1:
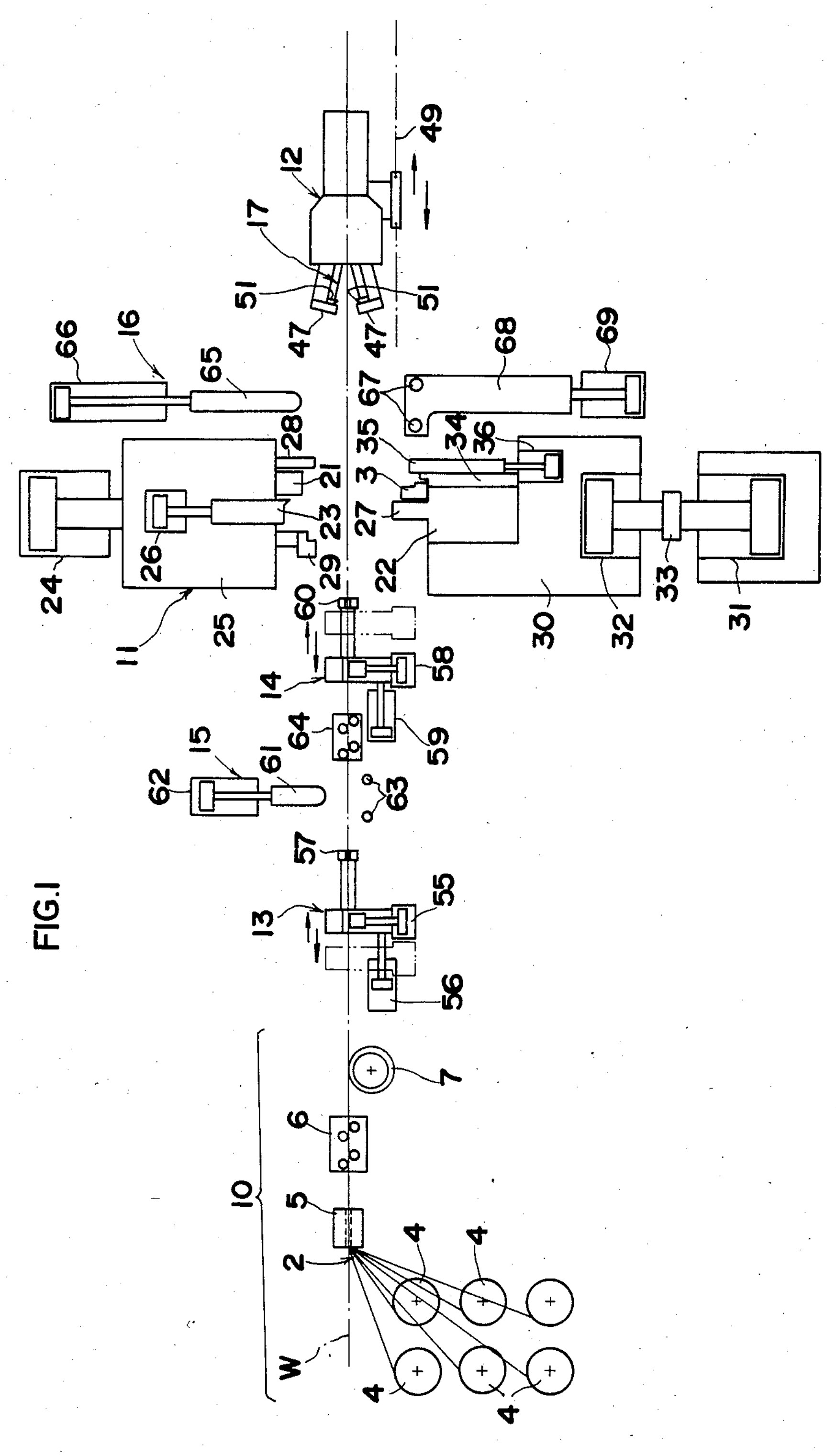
FIG. 1 is a diagrammatic front view showing apparatus for making electrical harnesses including a stripping device embodying the present invention.

Referring to FIG. 1, apparatus for manufacturing electrical harnesses includes a wire supplying device 10 which supplies wires 2 horizontally in parallel by means of a bundling device 5, the wires 2 being supplied along a wire feed path W through a straightener 6 and a feed roller 7; a connector attaching device 11 for attaching connectors 3 to the ends of the wires 2 by means of a punch 21 and a die 22 disposed on opposite sides of the wire feed path W, the punch and die having a cutting blade 23 located adjacent thereto; a connector supplying device (not shown) for supplying connectors to the die 22 one by one; a first moving chuck 12 which carries the wires 2 supplied to the connector attaching device 11 along the wire feed path W for a desired distance, whereby the desired length of the wires 2 is determined, and a second moving chuck 13 which holds the wires 2 horizontally at equal intervals in parallel and guide the same to the connector assembling device 11 at which the moving chuck 13 adjusts the positions of the wire ends. The second moving chuck 13 reciprocally moves in a predetermined relatively small range. In addition, the apparatus includes a third moving chuck 14 provided between the second moving chuck 13 and the connector attaching device 11 so that it moves in a predetermined range along the wire feed path W; a device for determining the lengths of insulation covering to be stripped, hereinafter referred to as the stripping length varying device 15, which is located between the second and third moving chucks 13 and 14; and a stripping device 17 for removing the insulation covering of the wires 2, the stripping device being mounted on the first moving chuck 12.

The connector supplying device includes a conventional hopper feeder and a magazine of a usual type, the description of which will be omitted for simplicity.

Figure 2:
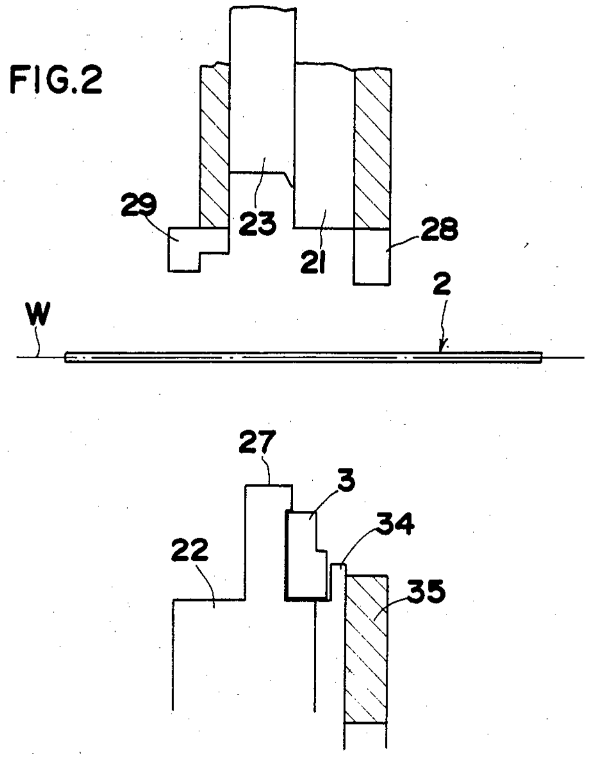
FIG. 2 is a vertical cross-section on a larger scale showing the main section of the connector attaching device shown in FIG. 1.
Figure 3:
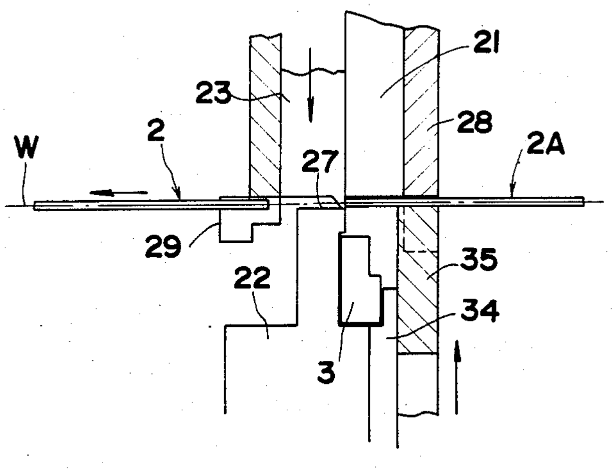
FIGS. 3 and 4 are cross-sectional views on a larger scale showing the operating states of the main section shown in FIG. 2.
Figure 4:
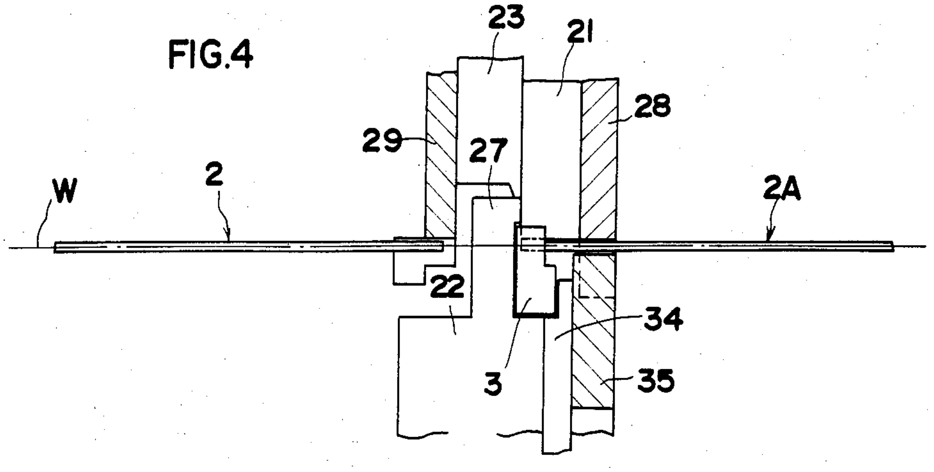

The punch 21 is mounted on a slider 24 which is raised and lowered by means of a pneumatic cylinder 24, and is lowered from the high position shown in FIG. 2 down to the lower position shown in FIGS. 3 and 4 where the connectors are attached to the wire ends. The cutting blade 23 is also mounted on the slider 25, and is operated by means of a pneumatic cylinder 26 fixed to the slider 25, independently of the punch 21. The cutting blade 23 cuts the wires at the preparatory position for connector attachment in cooperation with a cutting die 27. In addition, the slider 25 has a wire chuck 28 for holding the wires at the moment of connector attachment, and a wire guide 29.

The die 22 is mounted on another slider 30, which is raised and lowered by two steps by means of a first pneumatic cylinder 31 and a second cylinder 32 coupled to the first one through a joint 33 in such a manner that they can move together. The die 22 moves together with the slider 30. More in detail, the die 22 is raised from the position shown in FIG. 2 together with the slider 30 by means of the first pneumatic cylinder 31 until it reaches the preparatory position for connector attachment shown in FIG. 3. From the preparatory position it is further raised to the position shown in FIG. 4 where the connectors are attached to the wire ends. There is provided a connector presser 34 at the release side of the die 22, the connector presser 34 securing the connector 3 under the pressure of a spring (not shown). The connector presser 34 has a further wire chuck 35 located adjacent to, which mates with the wire chuck 28. This wire chuck 35 is operated by means of a pneumatic cylinder 36 mounted on the slider 30, independently of the die 22; it is raised from the preparatory position shown in FIG. 3 in cooperation with the wire chuck 28, and pinches the wires pulled to a predetermined length by the moving chuck 12.

Figure 5A:
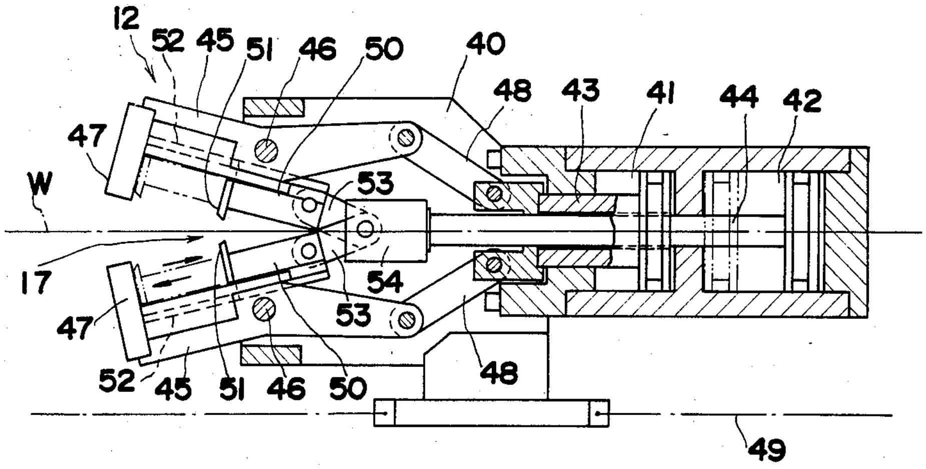
FIGS. 5(*a*) and 5(*b*) are partially cross-sectional views showing two aspects of the operating states of the first moving chuck shown in FIG. 1.
Figure 5B:
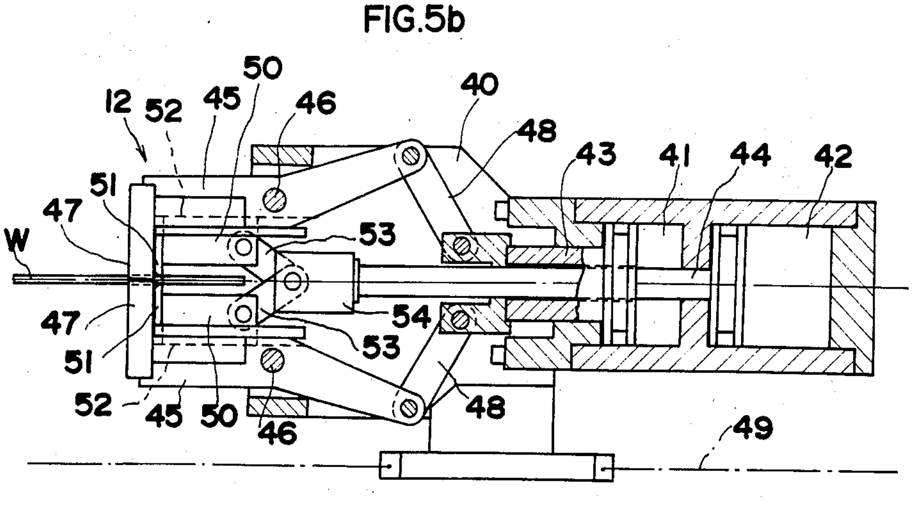

As shown in FIG. 5, the first moving chuck 12 includes a moving frame 40, and two pneumatic cylinders 41, 42 fixed to the moving frame 40. The two pneumatic cylinders 41 and 42 are coaxially provided, wherein the piston rod 44 of the cylinder 42 is passed through a piston rod 43 of the cylinder 41. A pair of arms 45 are pivotally fixed to the moving frame 40 at their middle portions by means of pins 46. Each arm 45 is provided with a chuck tooth 47 at its top end, and with a link 48 at its tail end, which link is connected to the piston rod 43 so that the chuck teeth 47 are opened and closed by means of the pneumatic cylinder 41. The moving frame 40 is reciprocally moved along the wire feed path W.

The stripping device 17 mounted on the first moving chuck 12 includes a slider 50, and a stripping blade 51 fixed to the top portion of the slider 50. The slider 50 is slidably provided in a dovetail groove 52 produced in an inner side of the arm 45, and the link 53 fixed to its end portion is coupled to a connecting member 54 provided in the top end of the piston rod 44. Under this arrangement the slider 50 is reciprocally moved along the dovetail groove 52 by means of the pneumatic cylinder 42. When the slider 50 is moved, the arms 45 are moved in association therewith, thereby enabling the chuck teeth 47 to open or close. In this way the stripping blades 51 are opened and closed.

The second moving chuck 13 is opened and closed by means of a pneumatic cylinder 55, and is reciprocally moved along the wire fed path W as shown in dotted lines in FIG. 1, wherein the moving range is relatively small. The reference numeral 60 denotes a wire guide.

The stripping length varying device 15 includes a plurality of varying plates 61, which are arranged laterally in such a manner that one plate corresponds to one wire, and which are individually capable of ascending and descending; a pneumatic cylinder 62 for moving the varying plates 61 as a whole up and down, and guide rollers 63, wherein the guide rollers 63 in pair and the varying plate 61 are juxtaposed on opposite sides of the wire feed path W. The reference numeral 64 denotes a straightener located adjacent to the stripping length varying device 15, so as to straighten up the wires bent by the varying plates 61.

Likewise, the wire length varying device 16 includes a plurality of varying plates 65; a pneumatic cylinder 66 for moving the varying plates 65 up and down, and guide rollers 67, which are provided on a carrier 68 capable of moving up and down by means of a pneumatic cylinder 69. This enables the guide rollers 67 to descend below the path of the first moving chuck 12.

An example of the operation will be described with reference to FIG. 8:

FIG. 8 shows the steps of attaching the connectors to the wires. In FIG. 8(*a*) the wires 2 have been supplied to the connector attaching device 11 by means of the feed roller through the second and third moving chucks 13 and 14. At first the wires 2 are pulled backward by the chuck 13 so as to align the top ends thereof with a desired point R. At this stage the first moving chuck 12 is shifted to under the punch 21. The second moving chuck 13 is kept open, and the third moving chuck 14, while pinching the wires 2, is caused to advance for a distance corresponding to the longest insulation covering to be stripped (FIG. 8(*b*). Then, as shown in FIG. 8(*c*), the wires 2 are released from the third chuck 14, and pinched by the second moving chuck 13. At this stage the stripping length varying device 15 is operated, thereby causing the individual varying plates 61 to descend so as to slacken the wires 2 downward. As a result, the end portions of the wires are withdrawn differently in length in accordance with the slackening lengths.

Figure 6:
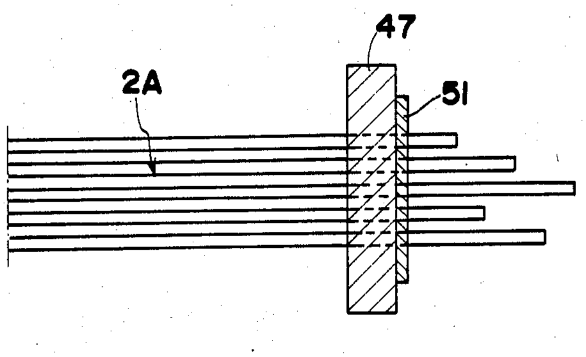
FIGS. 6 and 7 are diagrammatic views showing the operating states of the stripping device mounted on the moving chuck of FIG. 5.
Figure 7:
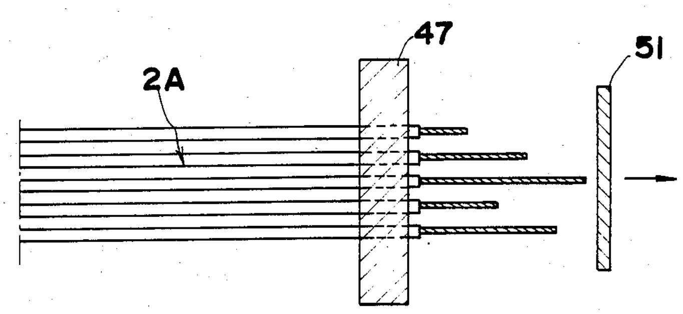
Figure 8A:
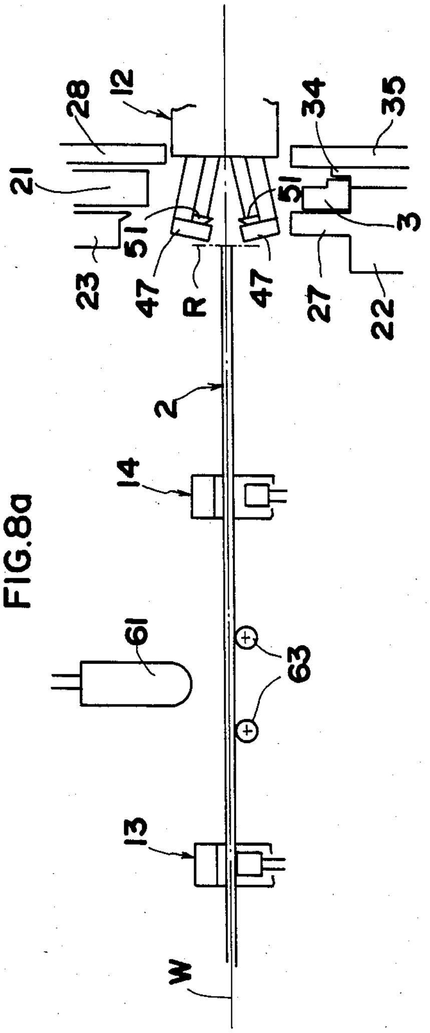
FIGS. 8(*a*) to 8(*f*) are diagrammatic views showing the operating steps of a connnector attaching operation.
Figure 8B:
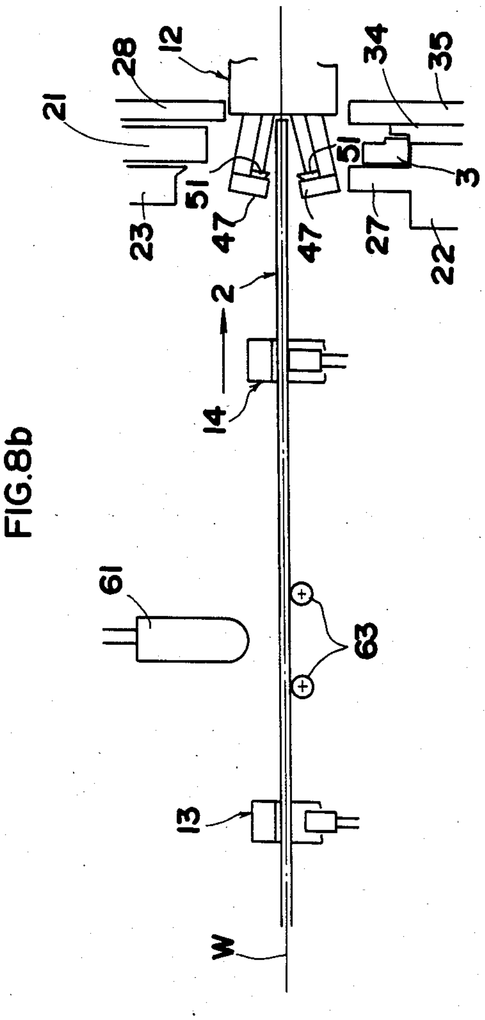
Figure 8C:
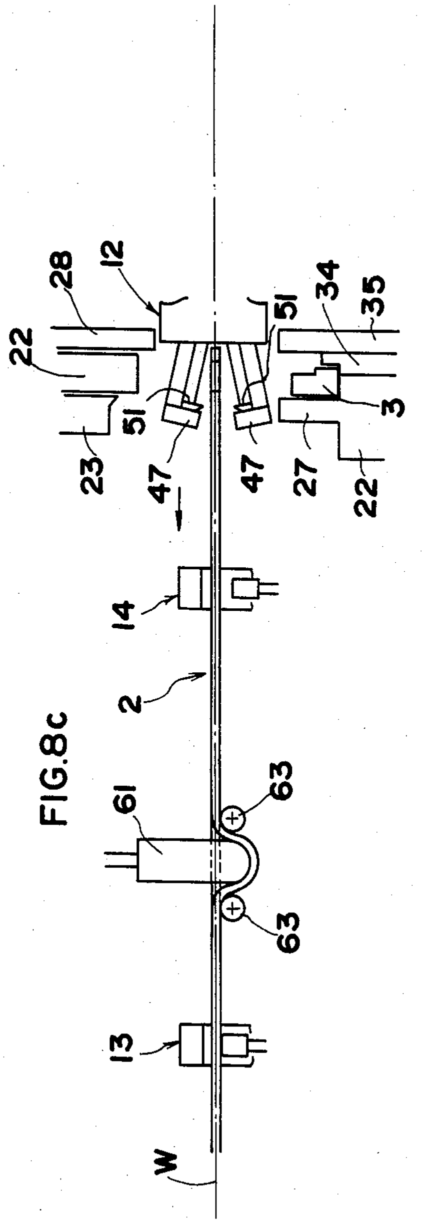
Figure 8D:
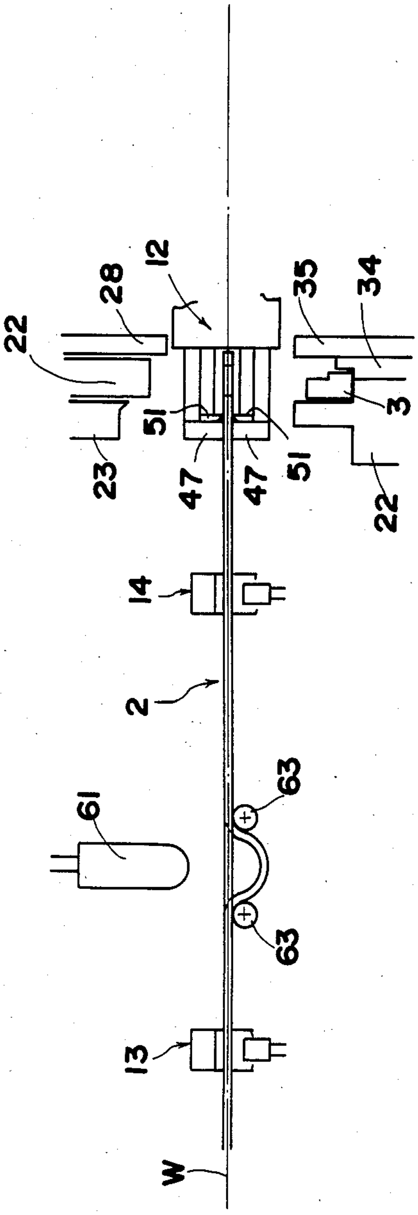
Figure 8E:
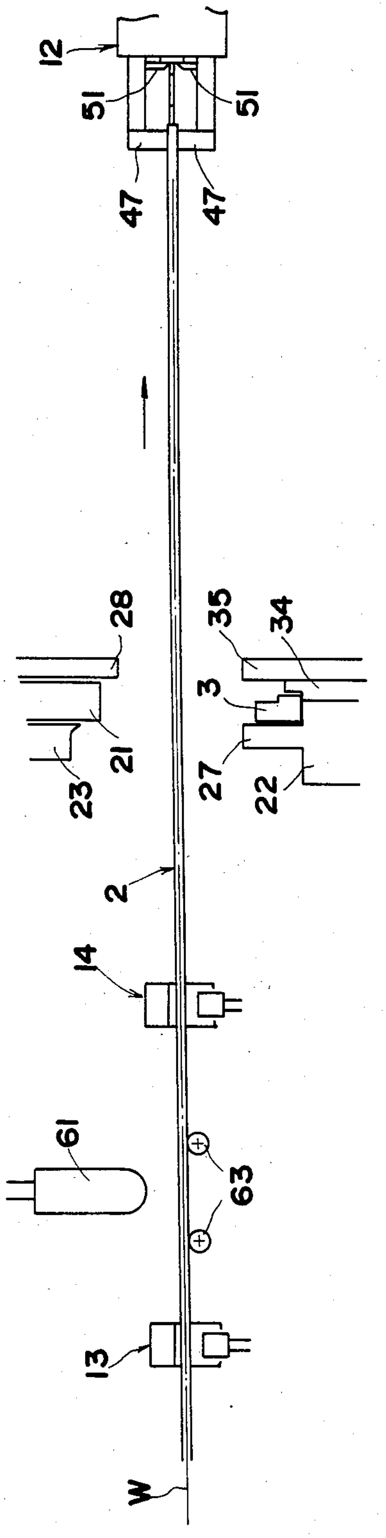
Figure 8F:
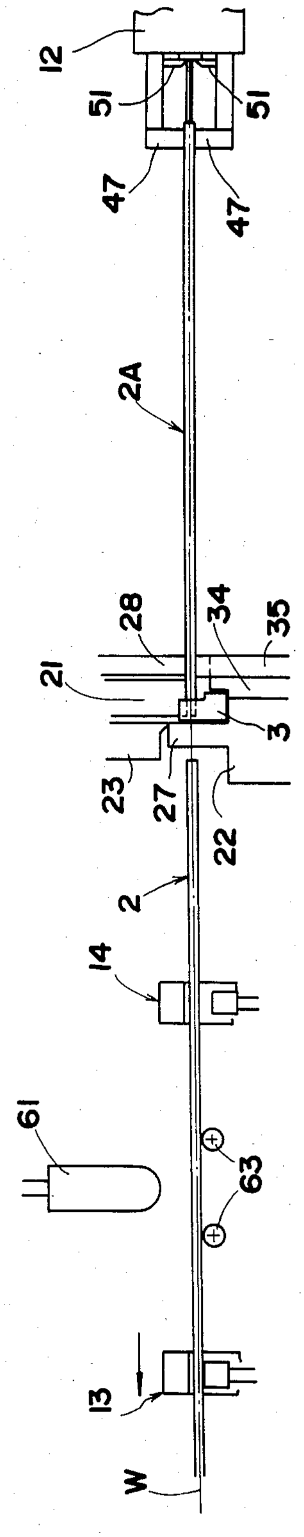
Figure 9A:
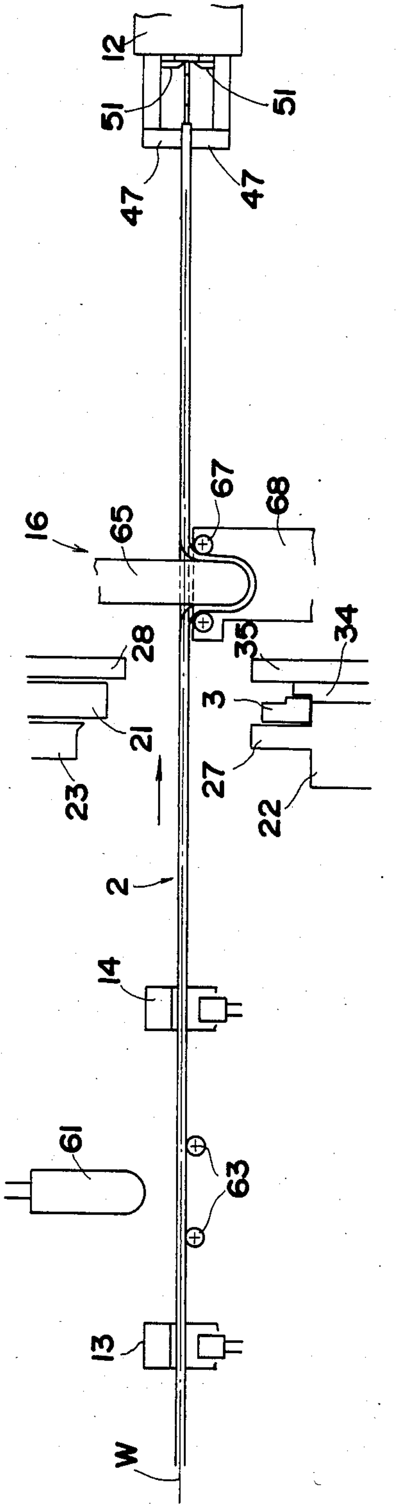
FIGS. 9(*a*) and 9(*b*) are diagrammatic views showing the operating steps of a modified connector attaching operation.
Figure 9B:
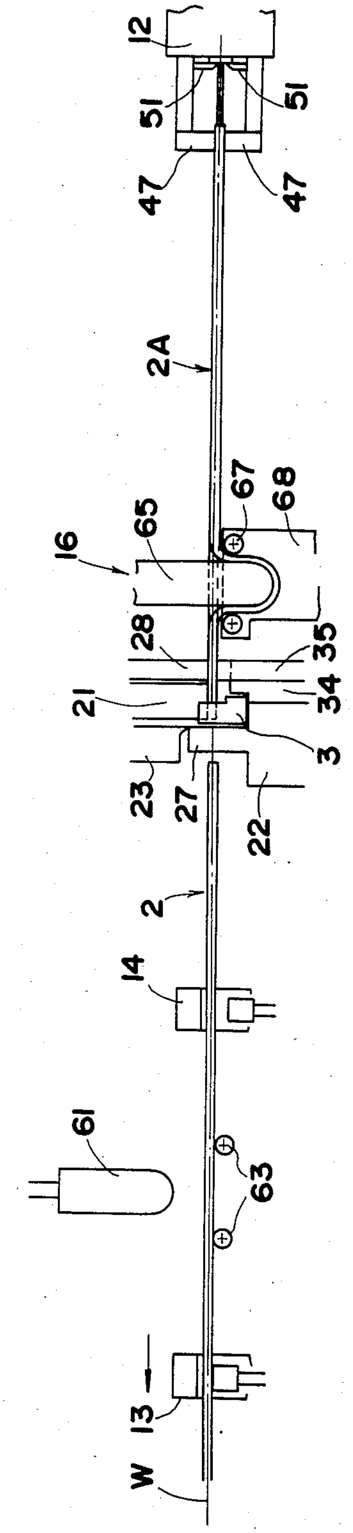
Figure 10:
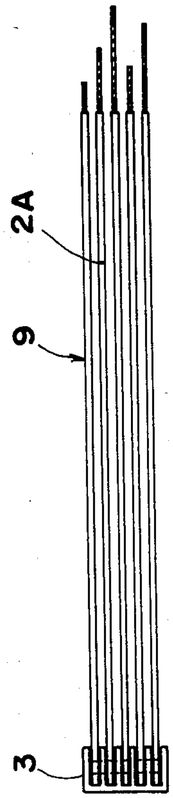
FIGS. 10 and 11 are schematic views showing finished electrical harnesses.

Then, the first moving chuck 12 is operated, and pinches the top ends of the wires 2 by means of the chuck teeth 47. At the same time the stripping blades 51 slit the insulation coverings of the wires (FIG. 8(*d*)). The first moving chuck 12 is advanced along the wire feed path W while pulling the wires to a desired length. At the middle of the pulling travel the stripping device 17 is operated to move the stripping blades 51 away from the chuck teeth 47, thereby stripping the insulation covering off the conductor (FIG. 8(*e*). As best shown in FIGS. 6 and 7, the lengths of the stripped conductors are varying, which is derived from the fact that the position of the top ends of the wires 2 are differentiated in accordance with the lengths to be stripped.

Then, the connector attaching device 11 is operated. At the preparatory position shown in FIG. 3 the wire cutting blade 23 is lowered to cut the wires 2 in cooperation with the die 27, and the wires are pinched by the second moving chuck 13 until the cut ends thereof are positioned at the point R. Then the assembling die 22 is raised up to the connector assembling position shown in FIG. 4, and the connector 3 is attached to the cut ends of the advancing wires 2A (FIG. 8(*f*). Then the assembling punch 21 is raised, and the assembling die 22 is lowered, thereby allowing the connector 3 attached to the wire ends to be released from the die 22. The wires 2A are further withdrawn by the first moving chuck 12, and discharged out of the apparatus. The same procedure is repeated.

As a result of the series of operation the wires 2A are cut to the predetermined lengths, and are provided with one connector 3 at one end, with the other ends being free from a connector, wherein the lengths of the stripped conductors are varied.

Figure 11:
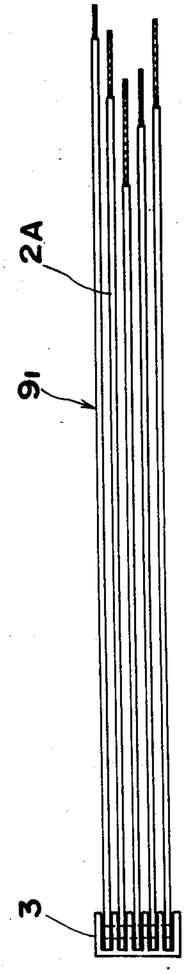

The harness $9_1$ shown in FIG. 11 is accomplished by slackening the wires under the action of the varying plates 65 in the aforementioned manner.

Figure 12A:
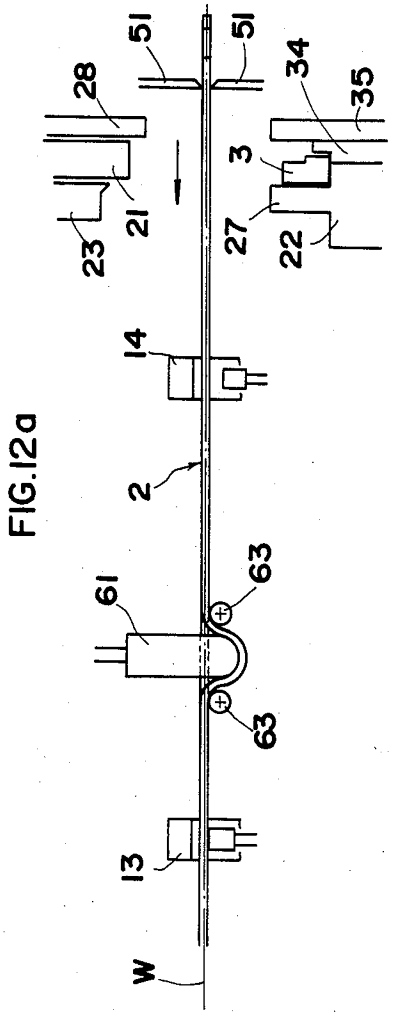
FIG. 12(*a*) and 12(*b*) are diagrammatic views showing the operating steps of a modified stripping device.
Figure 12B:
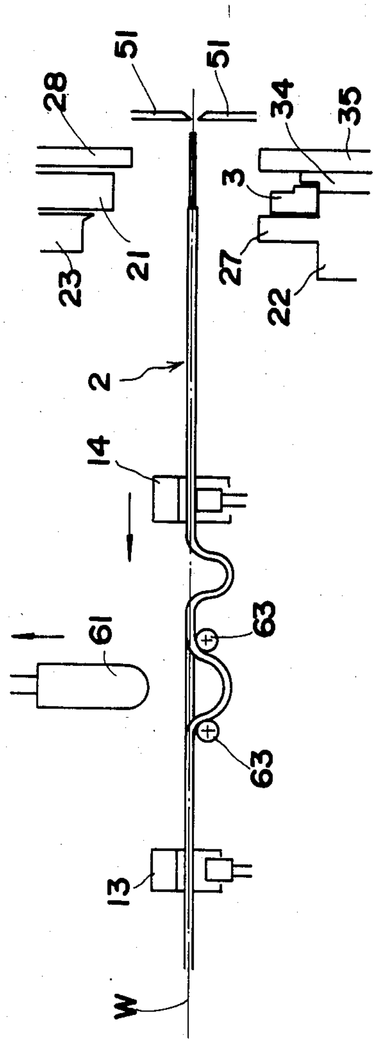

In the above-mentioned embodiment the stripping device 17 is mounted on the first moving chuck 12, but as shown in FIG. 12, the stripping blades 51 can be provided adjacent to the connector attaching device 11 as done under the conventional apparatus for making electrical harnesses. In this modified version the stripping blades 51 are inserted into the insulation covering without cutting the conductors, wherein the top ends of the wires are differentiated. The wires 2 are pulled backward by the third moving chuck 14 while the stripping blades are inserted into the insulation covering (FIG. 12(*a*)). As a result of the backward movement of the wires 2 the insulation covering is removed as shown in FIG. 12(*b*).

What is claimed is:

1. An insulation covering stripping device for use in combination with automatic apparatus for making electrical harnesses, wherein the apparatus includes a wire feed path extending substantially horizontally and axially of the apparatus; a connector attaching device comprising a cooperating assembling punch and die pair disposed on respective sides of the wire feed path, and a wire cutting blade located adjacent to the punch and die pair; a connector supplying device for supplying connectors to the assembling die; a first chuck reciprocally movable along the wire feed path for pulling out wires in an advancing movement for a distance corresponding to a desired length of the electrical harness; a second chuck for holding the supplied wires laterally at equal intervals, and guiding the same to the connector attaching device along the wire feed path, the second chuck reciprocally movable in a small range during which movement to align top ends of the wires, characterized in that the insulation covering stripping device comprises:

a third moving chuck for adjusting lengths of insulation covering to be stripped, the third moving chuck being located between the connector attaching device and the second moving chuck;

a stripping length varying device for varying the lengths of insulation covering to be stripped, the device being located between the second and third moving chucks, and including a plurality of varying plates which correspond to individual wires so that when the varying plates are moved down to push the wires individually, the wires are slackened downward, thereby causing the top ends of the wires to withdraw in accordance with a slackened portion; and a stripping blade for slitting the insulation covering so that the insulation covering is removed from the slit when the wires are pulled backward, wherein end portions of the wires are differentiated in length by the stripping length varying device.

2. An insulation covering stripping device as defined in claim 1, wherein the stripping blade is included in the first moving chuck.

3. An insulation covering stripping device as defined in claim 1, wherein the stripping blade is located adjacent to the connector attaching device.

* * * * *